United States Patent
Ascanelli et al.

(10) Patent No.: US 9,738,118 B2
(45) Date of Patent: Aug. 22, 2017

(54) TYRE FOR WHEELS OF HEAVY TRANSPORT VEHICLES

(75) Inventors: Alessandro Ascanelli, Milan (IT); Alexandre Bregantim, Milan (IT); Giuseppe Cereda, Milan (IT); Guido Luigi Daghini, Milan (IT)

(73) Assignee: PIRELLI TYRE S.P.A, Milan (IT)

(*) Notice: Subject to any disclaimer, the term of this patent is extended or adjusted under 35 U.S.C. 154(b) by 0 days.

(21) Appl. No.: 13/812,709

(22) PCT Filed: Aug. 3, 2011

(86) PCT No.: PCT/IB2011/053457
§ 371 (c)(1),
(2), (4) Date: Jan. 28, 2013

(87) PCT Pub. No.: WO2012/017399
PCT Pub. Date: Feb. 9, 2012

(65) Prior Publication Data
US 2013/0118668 A1 May 16, 2013

Related U.S. Application Data

(60) Provisional application No. 61/380,902, filed on Sep. 8, 2010.

(30) Foreign Application Priority Data

Aug. 6, 2010 (IT) .............................. MI2010A1524

(51) Int. Cl.
*B60C 9/18* (2006.01)
*B60C 9/22* (2006.01)
(Continued)

(52) U.S. Cl.
CPC .............. *B60C 9/18* (2013.01); *B60C 9/0007* (2013.04); *B60C 9/2006* (2013.04);
(Continued)

(58) Field of Classification Search
CPC B60C 9/18; B60C 9/20; B60C 9/2003; B60C 9/2006; B60C 9/2009; B60C 9/22; B60C 9/2204; B60C 9/28
See application file for complete search history.

(56) References Cited

U.S. PATENT DOCUMENTS 4,258,775 A * 3/1981 Samoto ..................... 152/531
4,420,025 A 12/1983 Ghilardi et al.
(Continued)

FOREIGN PATENT DOCUMENTS

EP 288987 * 11/1988
EP 0 335 588 A2 10/1989
(Continued)

OTHER PUBLICATIONS

Machine translation of JP 11-105152, 1999.*
(Continued)

*Primary Examiner* — Justin Fischer
(74) *Attorney, Agent, or Firm* — Finnegan, Henderson, Farabow, Garrett & Dunner, L.L.P.

(57) ABSTRACT

A tire includes a carcass structure including at least one carcass ply, a belt structure applied in a radially outer position with respect to the carcass structure and a tread band applied in a radially outer position with respect to the belt structure. The belt structure includes at least one reinforcing strip incorporating a plurality of reinforcing elements arranged substantially in the circumferential direction. The reinforcing elements include at least one high-elongation metal cord. The metal cord includes a plurality of intertwined strands and each strand includes a plurality of filaments. Advantageously all the filaments of each strand have a diameter not greater than 0.175 mm.

8 Claims, 8 Drawing Sheets

(51) Int. Cl.
*B60C 9/28* (2006.01)
*B60C 9/00* (2006.01)
*B60C 9/20* (2006.01)

(52) U.S. Cl.
CPC .............. *B60C 2009/0014* (2013.04); *B60C 2009/2077* (2013.04); *B60C 2009/2219* (2013.04); *B60C 2200/06* (2013.04); *Y10T 428/24* (2015.01)

(56) References Cited

U.S. PATENT DOCUMENTS

| 4,945,967 | A | 8/1990 | Tavazza et al. |
| 7,426,821 | B2* | 9/2008 | Soenen et al. .................. 57/236 |
| 2004/0026000 | A1 | 2/2004 | Shimizu |
| 2011/0253279 | A1 | 10/2011 | Daghini et al. |

FOREIGN PATENT DOCUMENTS

| EP | 0 572 906 A1 | | 12/1993 |
| EP | 572906 | * | 11/1996 |
| EP | 0 785 096 A1 | | 7/1997 |
| EP | 0 937 589 A1 | | 8/1999 |
| JP | 57026003 | * | 2/1982 |
| JP | 11-105152 | * | 4/1999 |
| WO | WO 2007/073753 A1 | | 7/2007 |
| WO | WO 2009/001376 A1 | | 12/2008 |
| WO | WO 2009/076970 A1 | | 6/2009 |
| WO | WO 2010/072464 A1 | | 7/2010 |
| WO | WO 2010/073270 A1 | | 7/2010 |
| WO | WO 2010/112304 | * | 10/2010 |

OTHER PUBLICATIONS

English-language translation of Japanese Pat. App. Pub. No. JP57-26003.

International Search Report from the European Patent Office for International Application No. PCT/IB2011/053457, mailing date Dec. 7, 2011.

Written Opinion of the International Searching Authority from the European Patent Office for International Application PCT/IB2011/053457, mailing date Dec. 7, 2011.

* cited by examiner

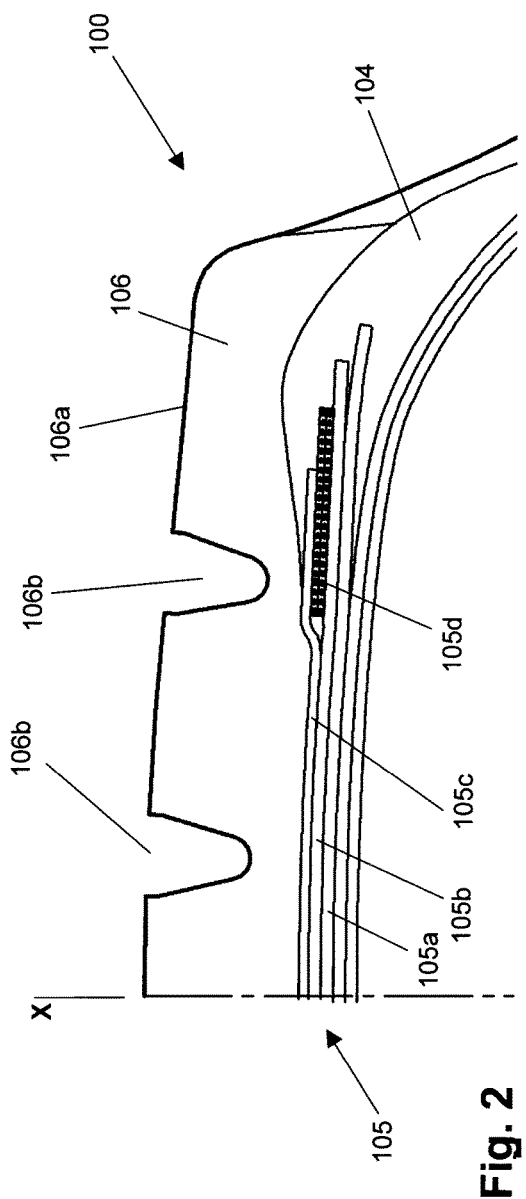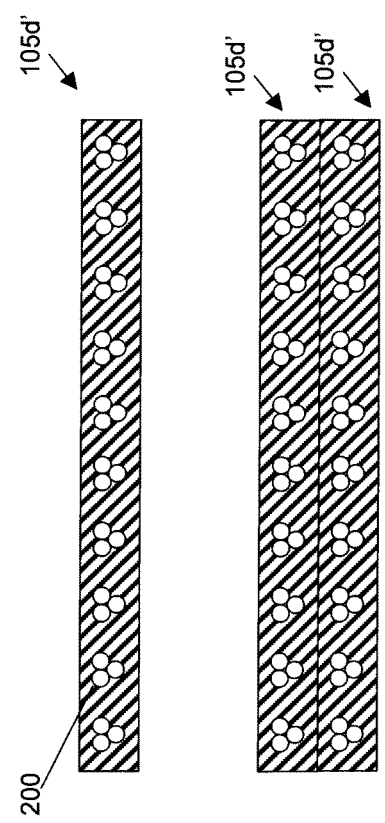
Fig. 2
Fig. 3a
Fig. 3b

TYRE FOR WHEELS OF HEAVY TRANSPORT VEHICLES

CROSS REFERENCE TO RELATED APPLICATIONS

This application is a national phase application based on PCT/IB2011/053457, filed Aug. 3, 2011, and claims the priority of Italian Patent Application No. MI2010A001524, filed Aug. 6, 2010, and the benefit of U.S. Provisional Application No. 61/380,902, filed Sep. 8, 2010, the content of all of which is incorporated herein by reference.

FIELD OF THE INVENTION

The present invention relates to a tyre for vehicle wheels, in particular for wheels of heavy transport vehicles, such as trucks, buses, trailers and in general vehicles where the tyre is subject to a high load. The present invention may also be applied to light transport vehicles, i.e. light trucks.

PRIOR ART

The documents U.S. Pat. No. 4,420,025, U.S. Pat. No. 4,945,967, EP 0,572,906, EP 0,785,096, EP 0,937,589, WO 2007/073753, WO 2009/001376 and WO 2009/076970 describe tyres for wheels of transport vehicles and, in particular, certain reinforcing structures for said tyres. WO 2010/073270 A1. US 2004/026000 and EP 0,335,588 A2 describe other tyres for vehicle wheels.

SUMMARY OF THE INVENTION

A tyre for wheels of light or heavy transport vehicles, such as trucks, buses, trailers or the like, is typically subject to particularly severe conditions of use. In fact, such a tyre may be used in relatively hostile environments (namely, for example, at very low temperatures or very high temperatures, in contact with surfaces which are dusty, muddy or have various types of asperities, etc.) and must therefore have particularly good stress resistance properties. Even when used in an urban environment, and therefore in an environment which is not particularly hostile, a transport vehicle tyre must in any case be able to withstand stresses of various types, arising for example when mounting or dismounting pavements and/or other similar obstacles.

A transport vehicle tyre may also be used for vehicles which are intended for long journeys on non-urban roads and/or motorways: in this case, the tyre must ensure an excellent performance in terms of driving comfort, both when fitted to a vehicle for transporting persons (bus) and when fitted to a vehicle for transporting goods (truck, articulated lorry, etc.). The driver of a modern transport vehicle in fact requires that the vehicle should be stable in terms of handling and require minimum correction (or no correction) when passing over minor asperities along straight running, but at the same should respond readily and/or uniformly when travelling around bends, so that the correct driving precision is ensured in any situation. Latest generation heavy transport vehicles require an improved handling performance since, in order to meet the demands of the market, they are designed to carry greater loads, owing to more powerful engines, improved suspension systems, different weight distribution between tractor unit and trailer, etc.

For the correct design of tyres which are intended for transport vehicles, and in particular heavy transport vehicles, it is therefore necessary to take account of these requirements which are increasingly requested and favourably viewed by vehicle users and/or fleet managers.

Often the abovementioned characteristics conflict with each other. In fact, in order to be able to ensure the necessary characteristics in terms of integrity, the structure of these tyres is typically strengthened and reinforced so as to be able to withstand the numerous varying stresses. For example, the internal structure of tyres for transport vehicles is composed of layers—carcass layer and/or belt layer—which comprise metal cords with a high breaking load which ensure that the tyre itself has a particularly good stress resistance, but at the same time result in the tyre having stiffness characteristics which adversely affect the driving comfort.

In order to improve the driving comfort characteristics of said tyres, the Applicant has tested the use of reinforcing cords comprising metal filaments with a smaller diameter. These smaller-diameter filaments possess high flexibility and lightness, which characteristics the Applicant considered would have resulted in a reduction in the stiffness of the tyre structure, while increasing the comfort.

On the other hand, it is widely known that these metal filaments with a smaller diameter have a breaking load which is substantially lower than the breaking load of the filaments typically used in cords intended to be incorporated in reinforcing layers of heavy transport vehicle tyres.

In keeping with what one would have normally expected, the Applicant therefore considered that the option of using filaments with a smaller diameter, without any further modification of other parts of the tyre structure, would have penalized the stress resistance characteristics of the tyre itself and therefore the integrity of the said tyre, owing to a reduction in the breaking load of the metal filaments used. The expected worsening of the stress resistance should have therefore been compensated for by reinforcement of other structural parts of the tyre.

Surprisingly, the Applicant has instead found that the provision of a rubberized strip comprising high-elongation cords arranged in a substantially circumferential direction and formed by filaments with a smaller diameter, in a radially outer position of the belt structure of tyres for transport vehicles, and at the axial ends of the belt structure itself, not only allows a significant improvement in the driving comfort of the heavy transport vehicle, but, in an entirely unexpected manner, also allows the stress resistance of the tyres to be improved.

This result has been confirmed by numerous rigorous indoor and outdoor tests which have been carried out by the Applicant and some of which will be described by way of example below. Without being necessarily limited to any one particular explanatory theory, the Applicant considers that this entirely unexpected synergic effect has been obtained owing to an improvement in the overall working performance of the belt structure, which appears to be able to absorb and dissipate more efficiently in all its reinforcing layers the stresses generated by impacts with the uneven surface of the ground, while ensuring at the same time an immediate and precise response to the stresses caused by the movement of the steering wheel and/or arising from the driving shaft of the vehicle.

Advantageously, the use of smaller-diameter filaments has also made it possible to provide a semifinished article with a smaller thickness, resulting in an improvement in the uniformity and a reduction in the overall weight of the tyre. Moreover, the corrosion resistance is also greatly improved as a result, owing to the very limited (if not substantially zero) presence of gaps and air between the filaments of the cords incorporated in the rubberized strip.

According to a first aspect, the present invention relates to a tyre for vehicle wheels, comprising a carcass structure comprising at least one carcass ply; a belt structure applied in a radially outer position with respect to said carcass structure and a tread band applied in a radially outer position with respect to said belt structure. The belt structure comprises at least one reinforcing strip incorporating a plurality of reinforcing elements arranged substantially in the circumferential direction (for example at an angle of between about 0° and 6° with respect to the circumferential direction). The reinforcing elements comprise at least one high-elongation metal cord. The metal cord comprises a plurality of intertwined strands and each strand comprises a plurality of filaments. Advantageously, substantially all the filaments of each strand have a diameter not greater than 0.175 mm, preferably not greater than 0.16 mm and more preferably not greater than 0.15 mm.

The term "high-elongation (HE) metal cord" is understood as meaning a cord which:
a. has a break elongation equal to at least 3.5%; and, preferably,
b. has part load elongation of between 1% and 3%. "Part Load Elongation" is understood as meaning the difference between the percentage elongation obtained when subjecting the cord to a tensile force of 50 N and the percentage elongation obtained when subjecting the cord to a tensile force of 2.5 N.

The characteristic "a" mentioned above (high elongation at breaking loads) is calculated using the BISFA E6 method (The International Bureau For The Standardization Of Man-Made Fibres, Internationally Agreed Methods For Testing Steel Tyre Cords, 1995 edition). The characteristic "b" mentioned above (high % elongation at low loads) is calculated using the BISFA E7 method (The International Bureau For The Standardization Of Man-Made Fibres, Internationally Agreed Methods For Testing Steel Tyre Cords, 1995 edition).

The expression "substantially all the filaments have a diameter not greater than 0.175 mm" is understood as meaning, in addition to the configuration where all the filaments of each strand have a diameter smaller than or equal to 0.175 mm, also the configuration where one or two filaments in each strand have a diameter greater than 0.175 mm and the remaining filaments of the strand have a diameter smaller than or equal to 0.175 mm.

According to a further aspect, a rubberized tape is provided, being configured so as to form a reinforcing strip for a tyre for vehicle wheels. The rubberized tape has an elongated form with a longitudinal axis. The rubberized tape comprises a plurality of reinforcing elements arranged substantially parallel to said longitudinal axis. The reinforcing elements comprise at least one high-elongation metal cord. In turn, the at least one metal cord comprises a plurality of intertwined strands and each strand comprises a plurality of filaments. Advantageously, substantially all the filaments of each strand have a diameter not greater than 0.175 mm, preferably not greater than 0.16 mm and more preferably not greater than 0.15 mm.

The present invention, in one or more of the abovementioned aspects, may have one or more of the preferred characteristics indicated below.

In some embodiments, as mentioned above, substantially all the filaments of each strand have a diameter not greater than about 0.16 mm, and preferably not greater than about 0.15 mm. For example, the filaments may have a diameter of about 0.14 mm, or of about 0.12 mm. Advantageously, the strands of the metal cord have the same characteristics in terms of arrangement of the filaments, number of filaments and diameter of the filaments.

The reinforcing strip may be formed by means of a single turn of a rubberized tape comprising a plurality of said reinforcing elements, wherein a first end of the rubberized tape is radially superimposed on a second end in an overlapping zone. Alternatively, the reinforcing strip may be formed by means of two or more radially superimposed turns of rubberized tape.

Said plurality of reinforcing elements could comprise a first number of reinforcing elements formed by filaments with a first diameter and a second number of reinforcing elements formed by filaments with a second diameter, wherein the first diameter is smaller than the second diameter.

Advantageously, the reinforcing elements formed by filaments with a first diameter may be arranged in an axially innermost position and the reinforcing elements formed by filaments with a second diameter may be arranged in an axially outermost position.

According to some embodiments, the metal cord has a configuration n×m, wherein n represents the number of strands and may be equal to 2, 3, 4 or 5 and wherein m represents the number of filaments in each strand and may be equal to 5, 6 or 7.

Preferably, at least one strand of the metal cord comprises a central filament and crown filaments arranged so as to form a single circular crown ring around said central filament. In one embodiment, the diameter of the central filament is greater than the diameter of the crown filaments by a percentage not exceeding 25%.

The belt structure may comprise at least two radially superimposed main belt layers incorporating a plurality of reinforcing elements which are substantially parallel to each other. The reinforcing elements in each layer are preferably inclined with respect to the circumferential direction of the tyre and are oriented so as to intersect the reinforcing elements of the adjacent layer.

The reinforcing strip described above may be advantageously arranged in a radially outer position with respect to the at least two main belt layers.

In a preferred embodiment the reinforcing strip is advantageously arranged at a respective axially outer end of the radially outermost layer of said at least two main belt layers.

A further belt layer arranged in a radially outermost position with respect to the at least two main belt layers and designed to protect the innermost layers of the tyre from penetrating stones and/or debris, may overlap at least partially the reinforcing strip, preferably substantially the entire reinforcing strip. Advantageously, in this configuration the radially outermost layer of the belt structure is positioned so as to protect the lateral reinforcing strip, improving the corrosion resistance thereof. This gives rise to significant advantages with regard to the possibility of reconstructing the tyre, both because the lateral reinforcing strip is not subject to corrosion phenomena and because during reconstruction of the lateral reinforcing strip it does not risk being accidentally removed during removal of the residual tread band.

In one embodiment, a reinforcing strip as described above may be applied between said at least two main belt layers. Said reinforcing strip may be preferably arranged in a radially outer position between said at least two main belt layers.

In one embodiment, a reinforcing strip as described above may be applied between said at least one carcass ply and the radially innermost belt layer. Said reinforcing strip may be preferably arranged in an axially outer position of a crown portion of said carcass ply, between said at least one carcass ply and the radially innermost belt layer of said at least two main belt layers.

Further features and advantages of the invention will emerge more clearly from the following description of a number of preferred embodiments thereof, provided hereinbelow by way of a non-limiting example, to be read with reference to the accompanying figures, in which:

FIG. 2 is a partial cross-sectional view of a tyre according to another embodiment of the present invention;

FIGS. 3a and 3b are schematic cross-sectional views of a tape of elastomer material with reinforcing elements for forming a lateral reinforcing strip of the belt structure of the tyre according to FIG. 1 or FIG. 2;

Figure 1:
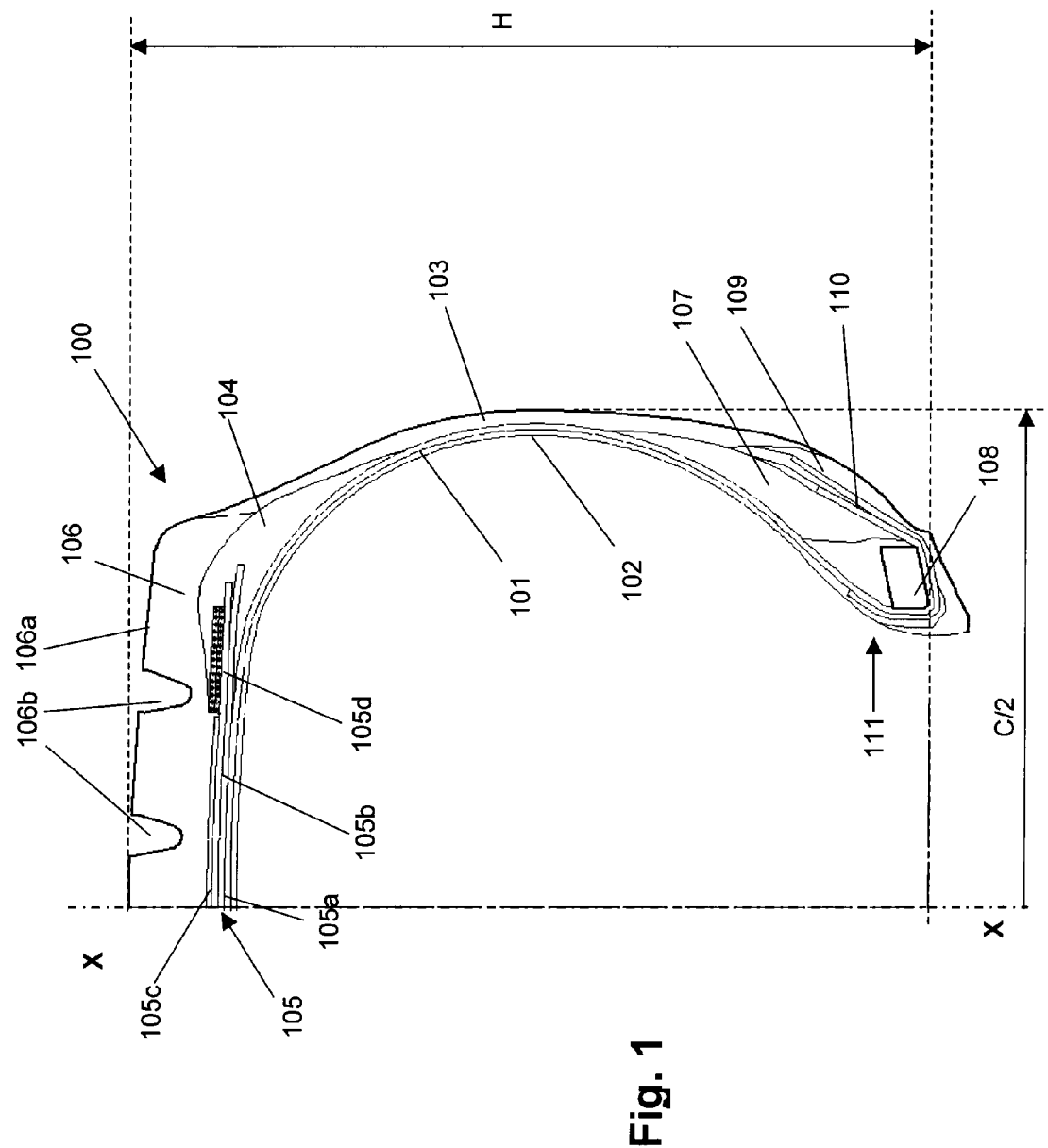
FIG. 1 is a partial cross-sectional view of a tyre according to a first embodiment of the present invention.

For the sake of simplicity, FIGS. 1 and 2 show only part of the tyre 100, the remaining part which is not shown being substantially identical and arranged symmetrically with respect to the equatorial plane X-X of the tyre. In the various figures, the same reference numbers indicate parts which are the same or functionally equivalent.

The tyre according to FIGS. 1 and 2 is a tyre for the wheels of light or heavy transport vehicles, such as trucks, buses, trailers, vans and generally vehicles where the tyre is subject to a high load. Preferably, such a tyre is designed to be mounted on rims having a diameter greater than or equal to 16", typically with a diameter greater than or equal to 17.5". A heavy transport vehicle is for example a vehicle belonging to the categories M2-M3, N2-N3 and 02-04 according to "ECE Consolidated Resolution of the Construction of vehicles (R.E. 3), Annex 7. Classification and definition of power driven vehicles and trailers". The category of heavy vehicles comprises trucks, tractor/trailers, lorries, buses, large vans and similar vehicles.

In the present description and in the claims which follow, the term "equatorial plane" is understood as meaning the plane perpendicular to the axis of rotation of the tyre and containing its centre line.

The tyre 100 comprises at least one carcass ply 101, the opposite side edges of which are associated with respective bead structures 111 comprising a bead core 108 and at least one bead filler 107. The association of said at least one carcass ply 101 and said bead structure 111 is typically achieved by folding over the opposite side edges of said at least one carcass ply 101 around said bead core 108 and said at least one bead filler 107 so as to form a carcass turnup 110.

The at least one carcass ply 101 generally comprises a plurality of elements for reinforcing the carcass ply which are arranged parallel to each other and are at least partially coated with a layer of crosslinked elastomer material. These carcass ply reinforcing elements, in particular in the case of truck tyres, are usually made of metal cords, preferably steel cords. Textile fibres, such as rayon, nylon, polyester or polyethylene terephthalate or mixtures thereof may be used for certain types of tyres (for example those intended for light transport, i.e. for light trucks).

The at least one carcass ply 101 is usually of the radial type, i.e. incorporates reinforcing elements arranged in a direction substantially perpendicular to the circumferential direction.

A belt structure 105 is applied in a radially outer position with respect to said at least one carcass ply 101. The belt structure 105 will be described in greater detail in the remainder of this description.

In the embodiment according to FIGS. 1 and 2, an insert 104 comprising a crosslinked elastomer material is arranged in the area where the side edges of the tread band 106 are connected to the sidewall 103. The insert 104 may also be arranged only between the carcass ply 101, the belt structure 105 and the sidewall 103.

A tread band 106, the side edges of which are connected to the sidewall 103, is applied circumferentially in a radially outer position with respect to said belt structure 105. Externally, the tread band 106 has a rolling surface 106a suitable for making contact with the ground. Circumferential grooves 106b, which may be connected by transverse sipes (not shown), define a tread pattern which comprises a plurality of ribs and/or blocks of various shapes and sizes which are distributed over the rolling surface 106a.

A sidewall 103 is applied externally onto the carcass ply 101. The sidewall 103 extends in an axially outer position, from the bead structure 111 to the tread band 106.

In the embodiments according to FIGS. 1 and 2, an elastomer layer 102, generally known as a liner, which provides the tyre with the necessary impermeability in relation to the inflation air, is provided in a radially internal position with respect to the carcass ply 101.

Preferably the tyre 100 according to the present invention has an aspect ratio (H/C) of between 0.35 and 1.1, more preferably between 0.45 and 1.0.

Said aspect ratio is the ratio between the height of the cross-section of the tyre H, i.e. the radial distance from the nominal diameter of the rim to the outer diameter of the tyre in its equatorial plane, and the width C (in FIGS. 1 and 2 the measurement C/2, i.e. half of C, is indicated) of the cross-section of the tyre, i.e. the maximum linear distance parallel to the axis of rotation of the tyre between the outer surfaces of the sidewalls (in accordance with E.T.R.T.O. edit. 2010 pages G3 and G4).

The belt structure 105 typically comprises two main belt layers 105a and 105b which are radially superimposed and incorporate a plurality of belt reinforcing elements, typically metal cords, preferably steel cords. Said belt reinforcing elements are parallel to each other in each belt layer and intersect the reinforcing elements of the adjacent belt layer and are inclined preferably symmetrically with respect to the circumferential direction of the tyre, at an angle of between 10° and 70°, and preferably between 12° and 40°. The belt reinforcing elements are typically coated with a crosslinked elastomer material.

Preferably, said belt reinforcing elements have a density between 30 cords/dm and 80 cords/dim, preferably between 40 cords/dm and 65 cords/dm, measured on said two main belt layers 105a and 105b, in a circumferential direction, in the vicinity of the equatorial plane X-X of the tyre 100.

Moreover, the belt structure 105 may also comprise a third belt layer 105c applied as a radially outermost layer of the belt structure 105 and provided with reinforcing elements, typically metal cords, preferably steel cords. The third belt layer 105 is also known as a "stone-guard belt". Said reinforcing elements of the stone-guard belt are arranged parallel to each other and are inclined with respect to a circumferential direction of the tyre at an angle of between 10° and 60°, and preferably between 12° and 40°. The reinforcing elements of the stone-guard belt are typically coated with a crosslinked elastomer material. Said third belt layer 105c acts as a protective layer preventing the penetration of stones and/or debris which may get trapped in the grooves of the tread (106b) and cause damage to the internal belt layers or even to the carcass ply 101.

Preferably, said reinforcing elements of the third belt layer 105c have a density between 30 cords/dm and 80 cords/dm, preferably between 35 cords/dm and 65 cords/dm, measured on said third belt layer 105c in a circumferential direction, in the vicinity of the equatorial plane X-X of the tyre 100.

In embodiments (not shown in the drawings) the belt structure could comprise at least one additional belt layer arranged between the at least one carcass ply 101 and the radially innermost main belt layer 105a. Said additional belt layer comprises reinforcing elements which are parallel to each other. In this additional layer the reinforcing elements could be inclined with respect to a circumferential direction of the tyre at an angle greater than that used in the main belts, typically between about 60° and about 90°, and preferably between about 65° and about 80°.

Advantageously the belt structure 105 of the tyre 100 also comprises a zero degrees reinforcing layer 105d applied in a radially outer position with respect to the second main belt layer 105b. This layer 105d may be substantially as wide as the main belt layers. However, typically, this layer 105d is formed with tapes of limited width positioned substantially at the axial ends of the belt 105.

In the embodiments shown in FIGS. 1 and 2, the layer 105d comprises a lateral reinforcing strip 105d which is called "zero degrees reinforcing strip", "lateral reinforcing strip" or simply "reinforcing strip". This lateral reinforcing strip 105d is positioned at the axial end of the tyre and is applied in a radially outer position with respect to the second main belt layer 105b. Said reinforcing strip 105d generally incorporates a plurality of reinforcing elements, typically metal cords, preferably steel cords. Unlike the other layers of the belt structure, the reinforcing elements in the zero degrees reinforcing strip are oriented in a substantially circumferential direction, thus forming an angle of a few degrees (for example an angle of between about 0° and 6°) with respect to the equatorial plane X-X of the tyre, and are coated with crosslinked elastomer material.

In the embodiment shown in FIGS. 1 and 2 the zero degrees reinforcing strip 105d is formed by means of the radial overlapping of one, two or three turns of a rubberized tape of predetermined width. The rubberized tape with which the zero degrees reinforcing strip 105d of the embodiment shown in FIGS. 1 and 2 is formed has a width substantially the same as the width of the strip 105d itself. FIGS. 3a and 3b show an embodiment of a rubberized tape 105d' suitable for forming a reinforcing strip 105d. The rubberized tape 105d comprises a number of reinforcing elements, typically metal cords. The number of reinforcing elements in the rubberized tape 105d varies depending on the width of the rubberized tape itself. They are arranged substantially parallel to each other. According to embodiments, the reinforcing elements are arranged in the rubberized tape with a density of between 30 and 70 cords/dm. The rubberized tape has a longitudinal axis and the reinforcing elements in the rubberized tape are arranged substantially parallel to said longitudinal axis. The width of a rubberized tape varies depending on the number of reinforcing elements. Preferably, the width of the rubberized tape (and therefore the zero degrees reinforcing strip 105d) is between about 10% and about 20% of the maximum width of the belt structure (namely the width of the belt layer extending furthest in the lateral direction). In some embodiments, the width of the rubberized tape may be between about 12.0 mm and about 60.0 mm. In certain embodiments, the thickness of the rubberized tape is between about 1 mm and about 1.5 mm.

FIGS. 3a, 3b show in schematic form a cross-sectional view of a first turn of rubberized tape 105d' and second turn of rubberized tape (which is superimposed radially on the first turn).

According to a preferred embodiment, the third belt layer 105c may be arranged radially on the outside with respect to the zero degrees reinforcing strip 105d. In this way the third belt layer covers at least partially the zero degrees reinforcing strip 105d. This ensures advantageous and important protection for at least a part of the zero degrees reinforcing strip 105d.

FIG. 2 shows a configuration of this preferred embodiment. The difference compared to FIG. 1 consists in the fact that a part (the axially outermost part) of the third belt layer 105c is arranged radially on the outside of the zero degrees reinforcing strip 105d. In this way the third belt layer 105c covers partially the zero degrees reinforcing strip 105d.

Preferably, the third belt layer 105c covers the zero degrees reinforcing strip 105d over at least half of its width. In one embodiment, the third belt layer covers substantially the entire zero degrees reinforcing strip 105d (for example at least 80% of the zero degrees reinforcing strip). This results in at least two main advantages. Firstly the zero degrees reinforcing strip 105d is much less subject to damage caused by stones, debris or other foreign bodies which could penetrate from the tread radially toward the inside of the tyre and which could allow penetration of an oxidising agent (for example water or moisture) towards the reinforcing elements of the zero degrees reinforcing strip. This ensures that the reinforcing strip 105d remains undamaged and greatly reduces the probability of the tyre being discarded during retreading, owing to corrosion of the reinforcing elements. Secondly, retreading of the tyre can be performed more easily and safely. In fact, the tread may be removed without the risk of tearing and unraveling the reinforcing strip.

As an alternative to the configuration shown in FIGS. 1, 2, 3a, 3b, the zero degrees reinforcing strip may be formed by means of axially adjacent spirals of a rubberized tape comprising reinforcing cords.

As an addition or alternative to the reinforcing strip 105d applied in a radially outer position with respect to the second main belt layer 105b, it is possible to envisage a zero degrees reinforcing layer (for example a strip arranged in an axially outer position) between the main belts 105a, 105b and/or a zero degrees reinforcing layer (for example a strip arranged in an axially outer position) between the carcass 101 of the tyre and the radially innermost main belt 105a. These embodiments are not shown in the Figures.

In this case also, the abovementioned zero degrees reinforcing layers arranged between the main belts and/or between the carcass and the radially innermost main belt may be formed by means of axially adjacent spirals of a rubberized tape comprising reinforcing cords.

According to embodiments of the present invention, the zero degrees reinforcing strip (or layer) 105d comprises high-elongation metal cords. These cords comprise a certain number "n" of strands which are stranded together.

The number "n" of strands may be two, three, four, five or more. According to one embodiment, each metal cord comprises three strands which are stranded together in the form of a helical winding, for example S-like winding (i.e. in a clockwise direction). An example of an arrangement of the strands according to this embodiment is shown schematically in the cord cross-section 200 in FIG. 4a or 4b.

Figure 4A:
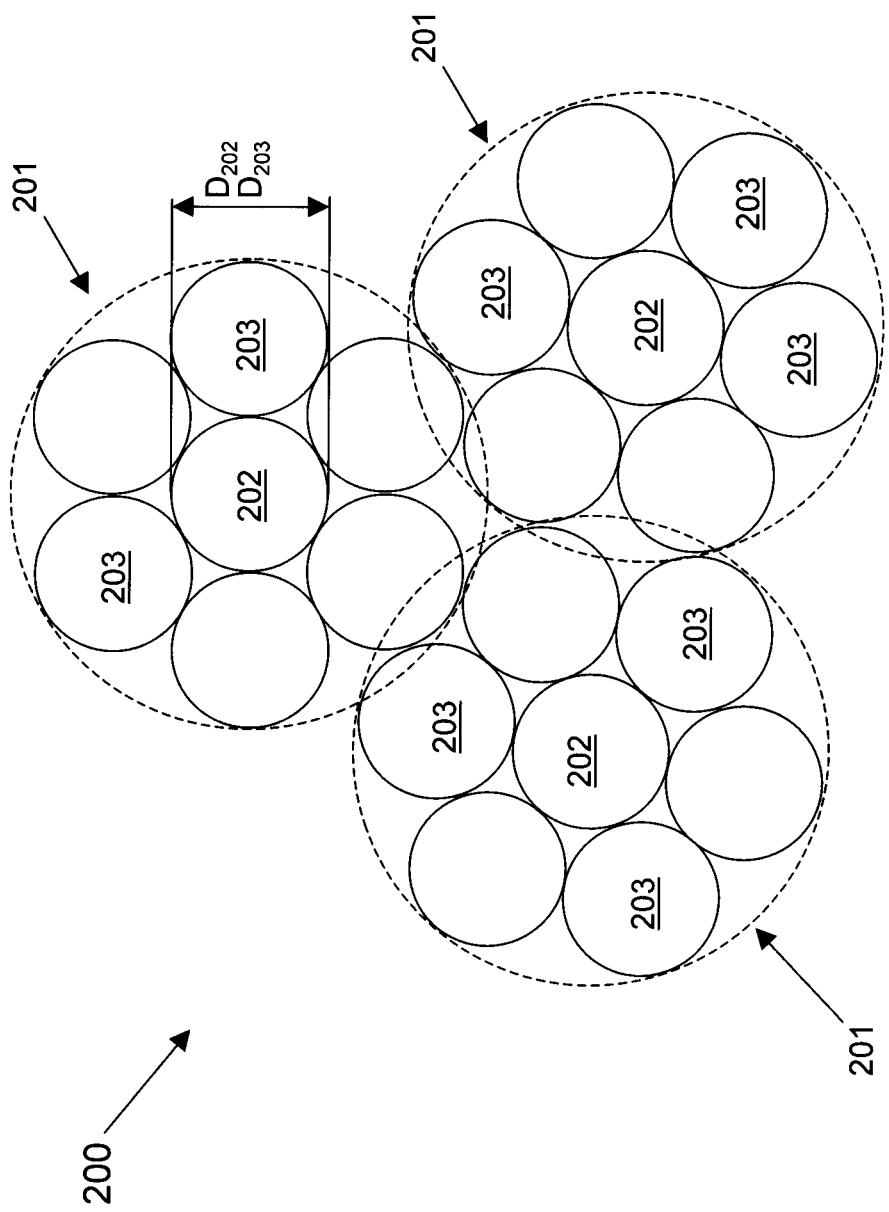
FIGS. 4a and 4b are schematic cross-sectional views of a reinforcing element for the lateral reinforcing strip of the belt structure according to embodiments of the invention.
Figure 4B:
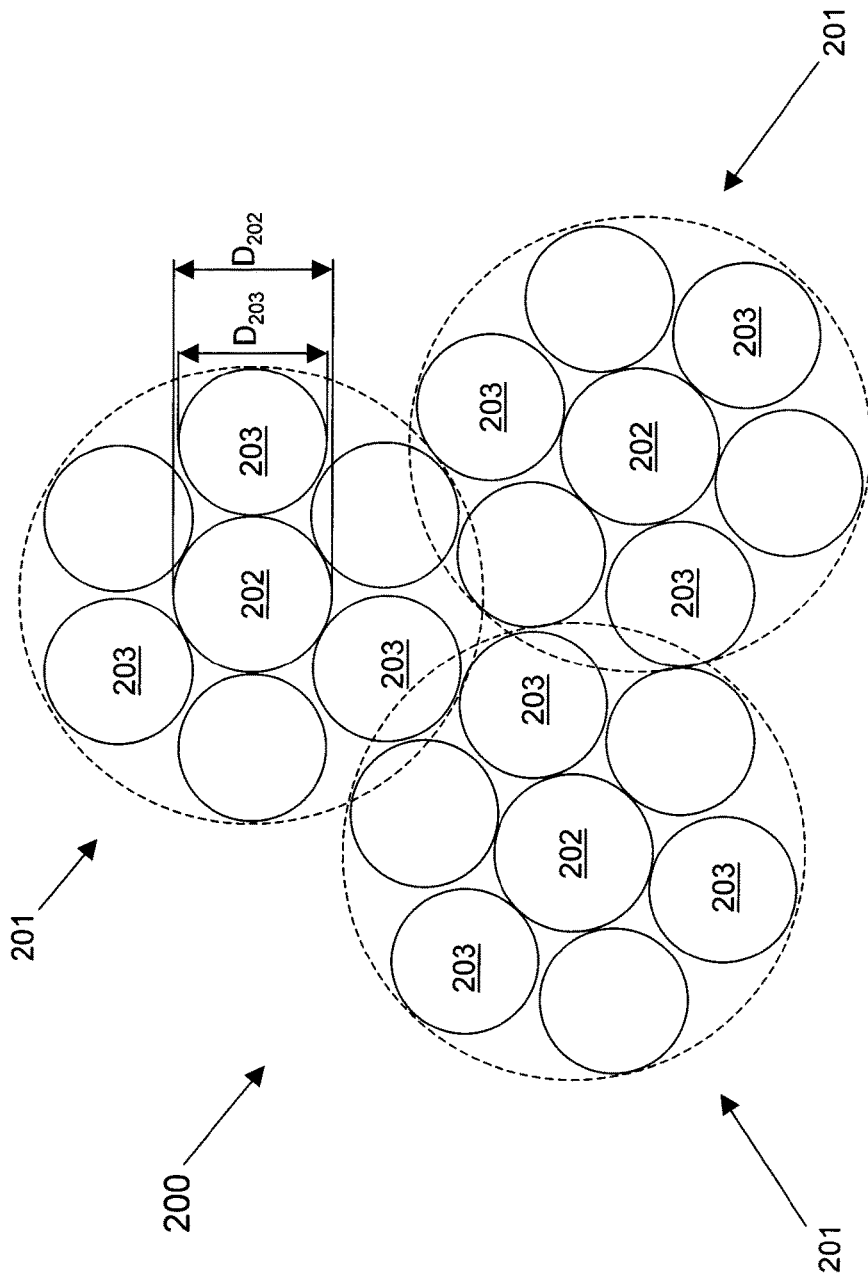

With reference to FIG. 4a or 4b, each strand 201 may comprise "m" filaments which are divided into a central filament 202 and "m−1" crown filaments 203. The crown filaments 203 are arranged substantially so as to form a single ring arranged as a circular crown around said central filament 202. The crown filaments 203 may be five, six or more than six in number. According to a preferred embodiment, they are six in number. The filaments 202, 203 are intertwined to form the strand 201 in the form of a helical winding, for example an S-like winding.

A metal cord formed by three strands in which each strand comprises seven filaments is referred to as "3×7". Generally, this reference is completed by an indication of the mean diameter of the cord filaments. Thus, a metal cord formed by three strands in which the filaments have a diameter of 0.14 mm is referred to as "3×7×0.14". Finally, the addition of the abbreviation "HE" indicates that the metal cord is of the high elongation type.

FIG. 4a shows in schematic form the cross-sectional view of a metal cord 200 according to an embodiment of the invention with three strands 201 which are stranded together and where each strand comprises a central filament 202 and a six crown filaments 203 (m=3 and n=7).

Conveniently, according to an embodiment of the present invention, all the filaments in each strand have the same diameter and all the strands have the same characteristics. The diameter of each filament is not greater than about 0.175 mm. For example, the diameter of each filament may be about 0.16 mm, 0.15 mm, 0.14 mm or 0.12 mm.

Alternatively, according to another embodiment of the invention, the filaments of each strand may have a mutually varying diameter. In some configurations, most of the filaments have a diameter less than or equal to 0.175 mm, but one or two filaments in each strand have a diameter greater than 0.175 mm, typically slightly greater, for example 0.18 mm. For example, the diameter of most of the filaments is equal to 0.14 mm or 0.12 mm.

The filament with a larger diameter may be the central filament, as for example shown in FIG. 4b. For example, the central filament 202 may have a diameter $D_{202}$ of 0.14 mm, while the diameter $D_{203}$ of the crown filaments 203 may be equal to 0.12 mm.

The diameter $D_{202}$ of the central filament 202 is greater than the diameter $D_{203}$ of the crown filaments 203 by a percentage preferably not exceeding 25%. More preferably, the diameter $D_{202}$ of the central filament 202 is greater than the diameter $D_{203}$ of the crown filaments 203 by a percentage preferably not exceeding 20%. For example, the diameter $D_{202}$ of the central filament 202 is about 5-7% greater than the diameter $D_{203}$ of the crown filaments 203.

According to embodiments of the present invention, each of the strands 201 has the same characteristics in terms of the number of filaments, arrangement of the filaments and diameter of the filaments. According to embodiments of the present invention, each of the strands 201 also has the same characteristics in terms of the stranding pitch of the filaments and material of the filaments.

According to preferred embodiments, the filaments 202, 203 of the strands 201 are stranded together in the form of a helical winding (for example an S-like winding). Preferably, the stranding pitch of the filaments 202, 203 is between about 2 mm and about 10 mm.

According to preferred embodiments, the strands 201 are in turn stranded together in the form of a helical winding (for example an S-like winding). Preferably, the stranding pitch of the strands 201 is between about 3 mm and about 12 mm.

As mentioned above, the filaments are preferably NT (normal tensile), HT (high tensile), SHT (super high tensile) or UHT (ultra high tensile) steel filaments. They are typically coated with brass or some other corrosion-resistant coating (for example Zn/Mn). In one embodiment, the central filament and the crown filaments are made of the same material and have had the same corrosion-resistance treatment. In other advantageous embodiments, the central filament is of steel which has better tensile strength characteristics (e.g. HT steel) than the crown filaments (e.g. NT steel) and/or has undergone a superior corrosion-resistance treatment. This improved corrosion resistance treatment may advantageously consist for example of a greater thickness of the brass coating. Alternatively, the central filament may be coated with Zn/Mn and the crown filaments may instead be brass-coated.

Table 1 shows a number of characteristic properties for three cords of varying filament diameter, i.e. "3×7×0.20" (cord A, comparison), "3×7×0.12" (cord B, invention) and "3×7×0.14" (cord C, invention).

TABLE 1

| Cord | Diameter filaments [mm] | Diameter cord [mm] | Linear weight [g/m] | Breaking load [N] | Break Elong. [N] | Elong. at 20 N [%] | Elong. at 50 N [%] | Elong. at 2.5-50 N [%] |
|---|---|---|---|---|---|---|---|---|
| A | 0.20 | 1.35 | 5.80 | 1467 | 5.6 | 1.12 | 2.02 | 1.89 |
| B | 0.12 | 0.82 | 1.92 | 766 | 3.7 | 1.95 | 2.11 | 1.69 |
| C | 0.14 | 0.97 | 2.66 | 968 | 4.2 | 1.93 | 2.08 | 1.89 |

Figure 5:
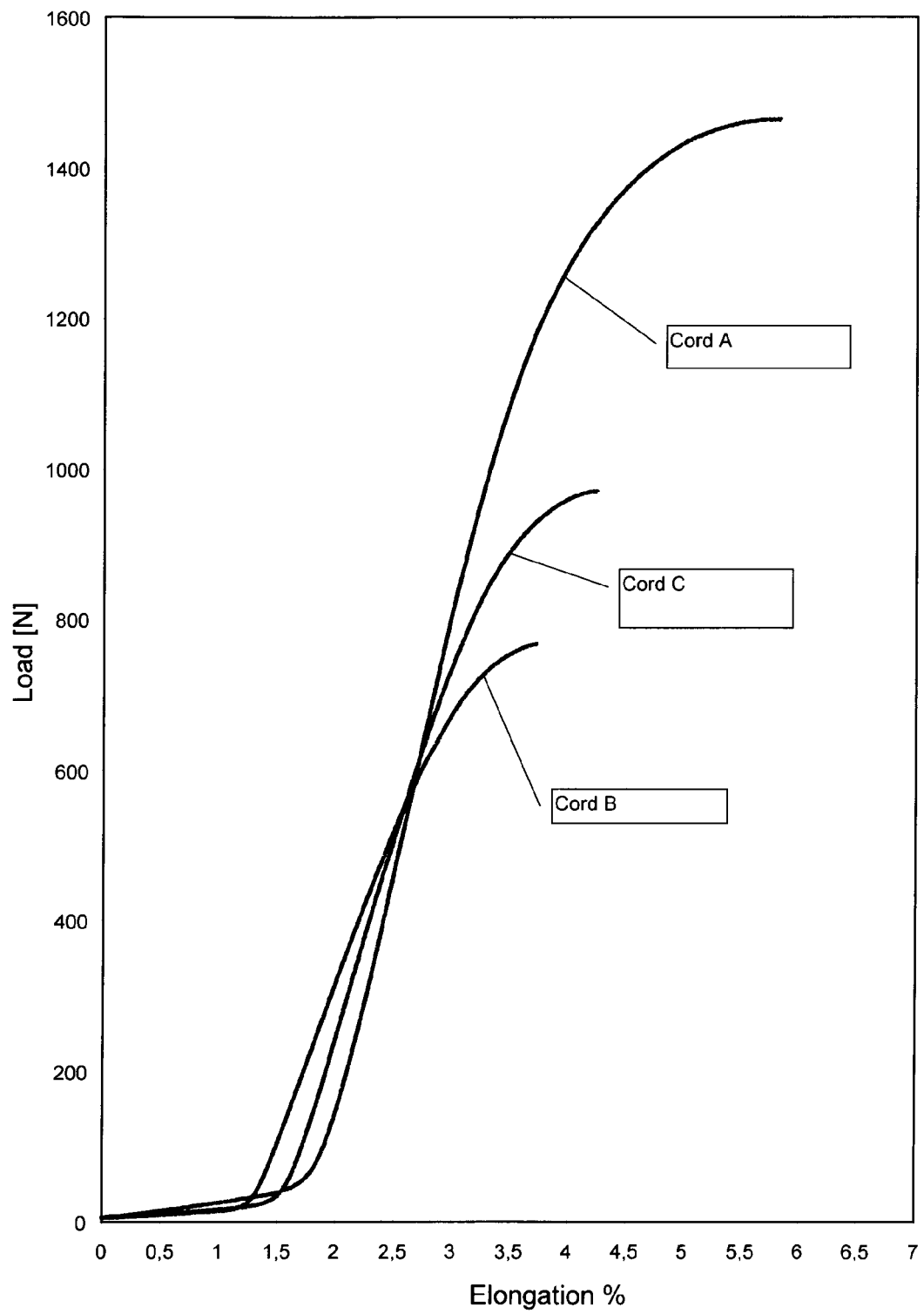
FIG. 5 is a load/elongation graph for three different reinforcing elements, one according to the prior art and two according to embodiments of the invention.
Figure 6:
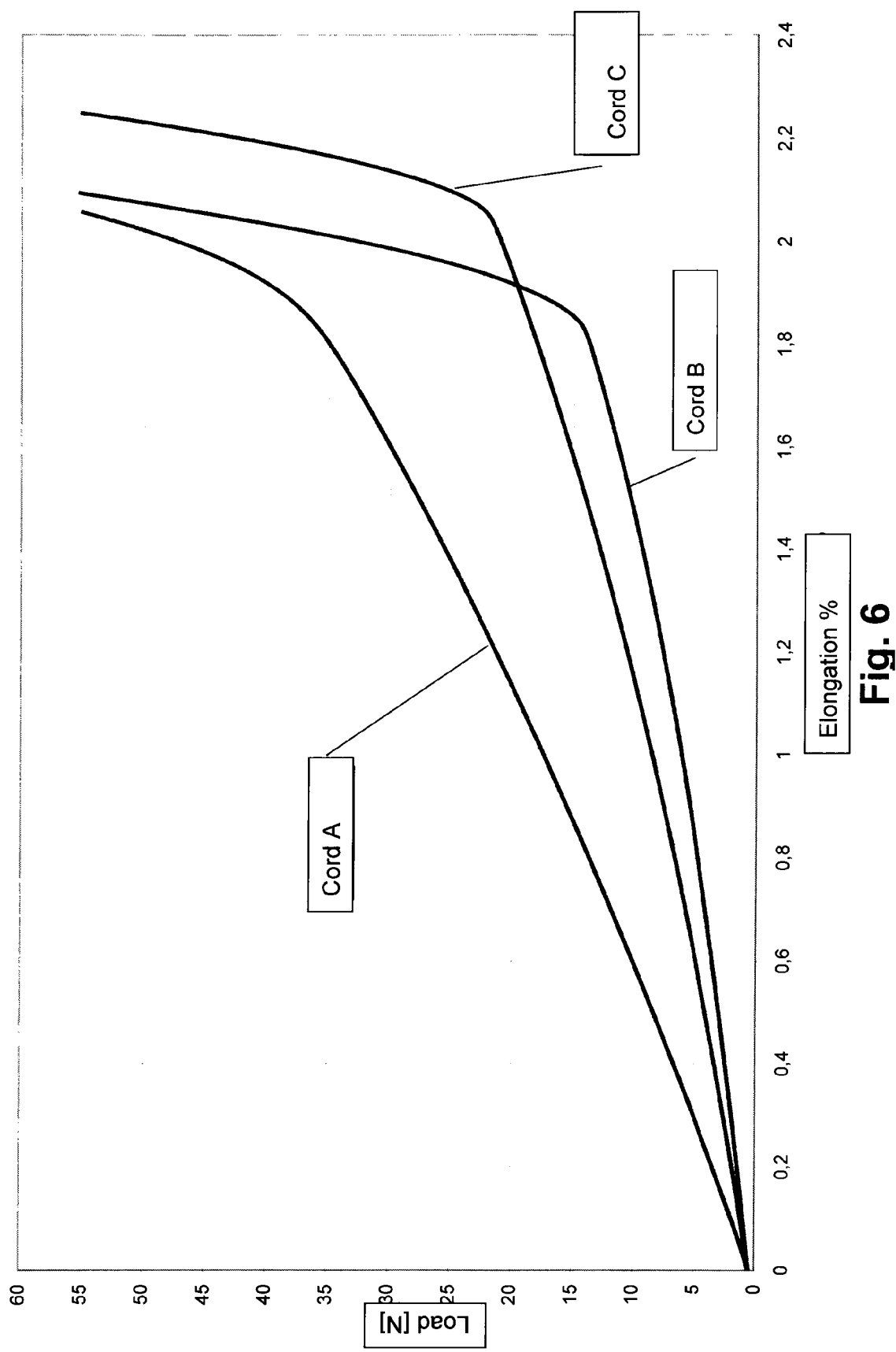
FIG. 6 shows an enlarged portion of the load/elongation graph of FIG. 5.

FIG. 5 shows a load/elongation graph for the cords A (comparison), B (invention) and C (invention). FIG. 6 shows an enlarged portion of the load/elongation graph of FIG. 5.

Advantageously, the cords B and C have a diameter much smaller than that of cord A. Therefore, cords B or C may be used to make zero degree reinforcing strips with a thickness smaller than that of a reinforcing strip made using cord A. For example, by coating the cords with elastomer material, two half-layers (an upper layer and a lower layer) with a thickness of about 0.15-0.20 mm are formed around cords B so as to obtain a reinforcing strip with a thickness of between about 1.12 mm and about 1.22 mm. Similarly, by coating the cords C with elastomer material, two half-layers (an upper layer and a lower layer) with a thickness of about 0.15-0.20 mm are formed around said cords C so as to obtain a reinforcing strip with a thickness of between about 1.26 mm and about 1.36 mm.

Owing to the smaller thickness of the reinforcing strips with cords B or C (according to the present invention), it is possible to reduce the irregularity in thickness at the axial ends of the zero degrees reinforcing strip. In particular, advantageously, the irregularity in thickness concentrated at the axially inner end of the zero degree reinforcing strip is reduced. Therefore, with reference again to FIG. 1, the step (in the radial direction) between the stone-guard belt and the zero degrees reinforcing strip is reduced. This results in an advantage in terms of driving comfort, less concentrated heating and better wear of the tyre. Advantageously, with reference to FIG. 2, owing to the smaller thickness (in the radial direction) of the zero degrees reinforcing strip it is possible to extend axially the stone-guard belt so as to cover, at least partially, the zero degrees reinforcing strip. The stone-guard belt may protect the reinforcing strip from excessive stresses (for example caused by impact with obstacles and/or penetration of stones and/or debris). This reduces considerably the possibility of separation of the belt layers occurring. This configuration has also proved to be extremely advantageous during retreading since it eliminates the risk, when removing the old tread, of accidentally engaging and removing also the zero degrees reinforcing strip.

Table 1 also shows that there is a reduction in weight of cords B and C compared to cord A. This reduction in weight of the cords may advantageously result in a reduction in weight of the tyre of between about 0.5 and 1.0 kg.

Considering again the values shown in Table 1 and the graphs shown in FIGS. 5 and 6 it is worth noting that the breaking load of the cords B or C is lower than that of cord A by a percentage of between about 35% and 45%. Nevertheless, no deterioration in the stress resistance and/or integrity characteristics of the tyre according to the invention have been noted. On the contrary, the tests carried out by the Applicant have surprisingly shown that there is an improvement in these characteristics.

The cords in the zero degrees reinforcing strip may all have the same diameter. According to an advantageous embodiment of the invention, the plurality of reinforcing elements could comprise a first number of reinforcing elements formed by filaments with a first diameter and a second number of reinforcing elements formed by filaments with a second diameter, wherein the first diameter is smaller than the second diameter.

Advantageously, the reinforcing elements formed by filaments with a smaller diameter may be arranged in an axially innermost position, and the reinforcing elements formed by filaments with a larger diameter may be arranged in an axially outermost position. For example, a strip could comprise a number of reinforcing elements (metal cords) formed by filaments with a diameter of 0.12 mm and a number of reinforcing elements formed by filaments with a diameter of 0.14 mm. In this embodiment, during manufacture of the tyre, the strip is wound so that the metal cords formed with filaments having a diameter of 0.14 mm are arranged axially outside in the finished tyre.

The Applicant also carried out tensile and compression tests on a zero degrees reinforcing tape comprising cords A, B and C. In particular, the following rubberized tapes, all with the same width and reinforced with metal cords A, B and C, were compared:

Tape A (reference): rubberized tape reinforced by 15 cords A 3×7×0.20HE;

Tape B (invention): rubberized tape reinforced by 18 cords B 3×7×0.12HE; and

Tape C (invention): rubberized tape reinforced by 17 cords C 3×7×0.14HE.

The following tests were carried out:

Test 1: tensile test carried out on vulcanized tapes;

Test 2: tensile test carried out on non-vulcanized tapes; and

Test 3: ring compression test carried out on vulcanized tapes.

The details of the test conditions are shown in Table 2 (Test 1 and Test 2) and in Table 3 (Test 3).

TABLE 2

| Length of test piece [mm] | 200 |
|---|---|
| Tension Speed [mm/min] | 5 |
| Max. load [N] | 400 |
| Initial pre-load [N] | 5 |

TABLE 3

| Ring diameter [mm] | 80 |
|---|---|
| Compression speed [mm/min] | 100 |
| Degree of crushing [mm] | 25 |
| Initial pre-load [N] | 0.5 |

Figure 7:
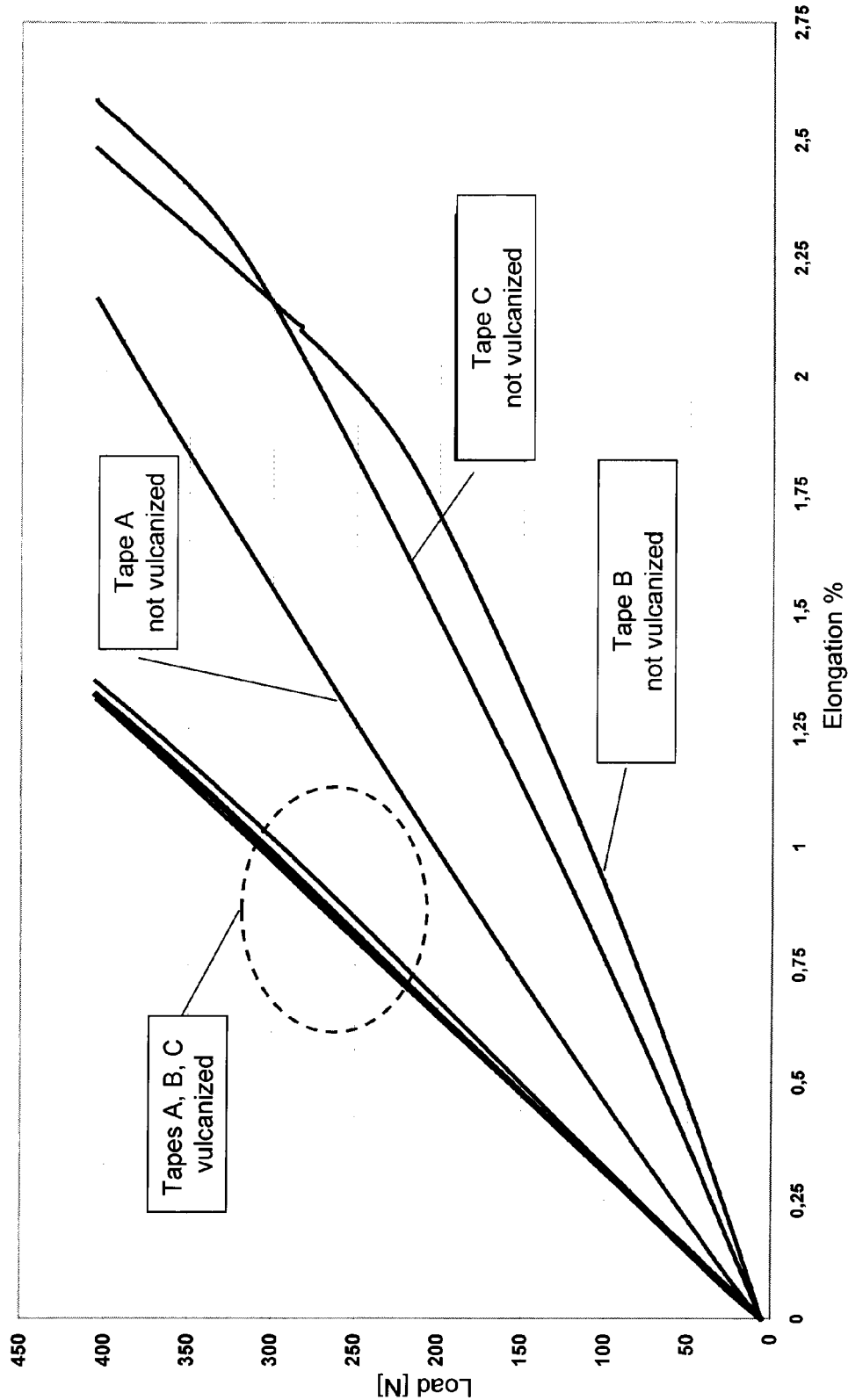
FIG. 7 is a load/elongation graph which shows the outcome of Tests 1 and 2 described below.

FIG. 7 is a load/elongation graph which shows the results of Tests 1 and 2 for low loads. No major differences in behaviour between the various tapes—neither in the unprocessed state nor in the vulcanized state—may be noted.

Figure 8:
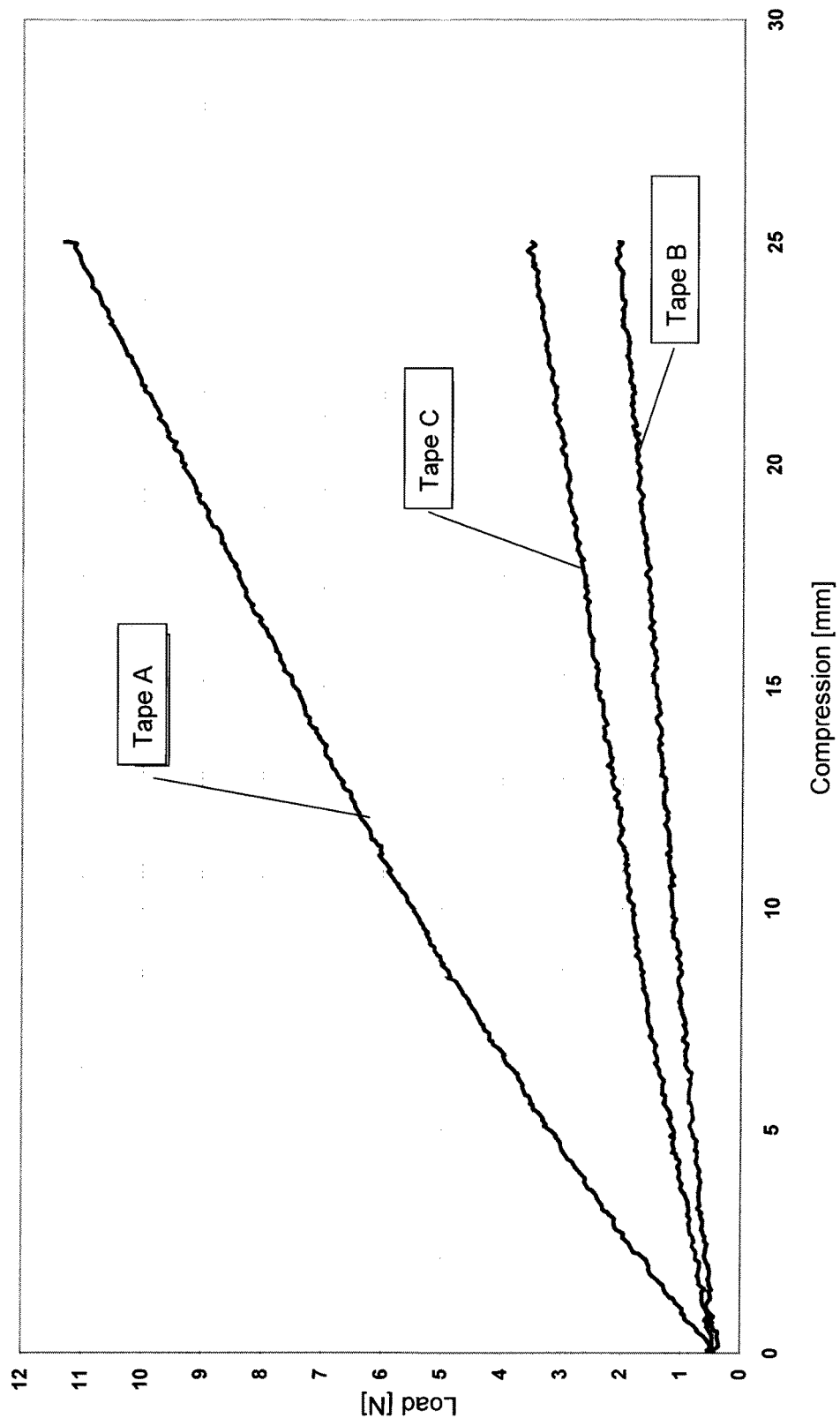
FIG. 8 is a load/elongation graph which shows the outcome of Test 3 described below.

FIG. 8 is a graph which shows the results of Test 3. The tape according to the invention is significantly (and advantageously, for the purposes of driving comfort) less stiff than tape A (comparison tape).

In order to estimate the corrosion resistance of the cords incorporated in the tapes, the Applicant also carried out an experimental test with regard to penetrability. The penetrability test was carried out by immersing (one at a time) in an alcohol bath the (vulcanized and non-vulcanized) tapes A, B and C and calculating the air expelled. The results of the penetrability test are shown in Table 4.

TABLE 4

| Tape A - non-vulcanized | 100 |
|---|---|
| Tape B - non-vulcanized | 45 |
| Tape C - non-vulcanized | 61 |
| Tape A - vulcanized | 100 |
| Tape B - vulcanized | 14 |
| Tape C - vulcanized | 30 |

From the results obtained it is evident that tapes B and C contain much less air than tape A and therefore they are less subject to corrosion phenomena.

The Applicant also carried out indoor and outdoor tests on tyres 315/80R22.5 with a tread pattern adapted to the steering shaft of a heavy vehicle. Three types of tyre were manufactured and tested: a tyre A (with two strips type A), a tyre B (with two strips type B) and a tyre C (with two strips type C). In tyres B and C the stone-guard belt layer was arranged so as to cover partially the respective strips.

Indoor Test

The indoor test carried out on tyres A, B and C consisted in causing the tyres to rotate under a predefined load starting from a certain speed and increasing the speed gradually until separation of the belt occurred. The time required to achieve separation of the belt in tyre B and in tyre C was, respectively, 29% and 30% greater than the time required for tyre A.

First Outdoor Test

The first outdoor test consisted in repeatedly mounting/dismounting a pavement kerb at a small angle relative to the direction of the kerb. At the end of the test, for each tyre, the total length of the incisions formed in the axially outermost longitudinal groove was calculated. The total length was obtained by adding together the lengths of the single incisions. The total length of the incisions formed in tyre C was 22% less than the total length of the incisions formed in tyre A. The total length of the incisions formed in tyre B was 78% less than the total length of the incisions formed in tyre A.

Despite the use of cords with a low breaking load, the result of this test was therefore, surprisingly, clearly favourable for the tyres B and C. The Applicant considers that this significant improvement is due to a greater adaptability and deformability of the reinforcing strips B and C compared to the reinforcing strip A.

Second Outdoor Test

The second outdoor test was carried out on a track, using four tyres mounted on a trailer and pulling the trailer, alternately, at a constant speed along a straight path for a predefined number of hours and around a figure-of-eight circuit for a predefined number of hours. During travel along the straight section the tyres were affected mainly by thermal stressing. During travel around the figure-of-eight circuit the tyres were also affected mainly by (alternate) mechanical stressing. The test terminated after a predefined number of kilometers had been completed or until separation of a tyre tread occurred (the tread being replaced in order to continue the test with the other tyres). The test was carried out using the tyres A, B and C.

In the case of all the tyres A separation of the tread occurred before 70% of the predefined total distance had been covered.

Two of the four tyres B completed the predefined total distance. In the case of the third and fourth tyre B separation of the tread occurred after travelling overall 99% and 66% of the predefined total distance.

Three of the four tyres C completed the predefined total distance. The fourth tyre completed overall about 92% of the predefined total distance.

This result of this test also was therefore, surprisingly, favourable for the tyres B and C.

Third Outdoor Test

The third outdoor test consisted in a road driving test. The test was carried out by a test driver who covered a same stretch of motorway of a mixed nature (i.e. with bends, straight sections, uphill and downhill sections) using the same vehicle, fitted, in turn, with tyres A, B and C, with the same transported load and tyre inflation pressures.

The test driver expressed a series of subjective evaluations regarding the behaviour of the tyres. Tyre A was used as the reference tyre. Table 5 shows the parameters evaluated by the test driver and a symbol (+, −, =), the symbol "+" indicating an improvement compared to tyre A, the symbol "−" indicating an inferior performance and the symbol "=" indicating no difference detected by the test driver compared to the tyres A.

In particular:

with regard to the evaluations for travel along the straight, the test driver assessed mainly the effect of the front tyres on the steering performance and in particular the ability to maintain the direction of the vehicle under all travel conditions;

with regard to the evaluations for handling, the test driver evaluated mainly the effect of the front tyres on the steering performance and in particular the reaction time of the vehicle to a set steering angle;

as regards realignment after overtaking and lateral stability, the test driver assessed both the effect of the front tyres and the effect of the rear tyres on performance, and in particular the realignment time and the behaviour of the vehicle when changing suddenly from one lane to another;

as regards comfort, the test driver evaluated mainly the effect of the front tyres on the steering performance and in particular the impact damping time when travelling over a rough road surface (and/or vibration of the steering wheel).

TABLE 5

| Parameter evaluated | Tyre B | Tyre C |
| --- | --- | --- |
| Travel along the straight - centring on a straight path | + | + |
| Travel along the straight - centring on an undulating path | + | + |
| Travel along the straight - Loading around a 0° steering angle | + | + |
| Travel along the straight - Track effect | = | = |
| Handling - Promptness | = | = |
| Handling - Gradual thrust | + | + |
| Handling - Centring around bends | = | = |
| Handling - Centring on small angles | + | + |
| Realignment after overtaking | + | + |
| Lateral stability - Compliance | + | + |
| Lateral stability - Gradual transfer of load | + | + |
| Lateral stability - "Wobble" effect | = | = |
| Comfort - Softness | + | + |

In the evaluations shown the test driver expressed a very positive opinion for tyres B and C, which demonstrated: an improved ability to maintain straight travel without the need for substantial and frequent correction of the steering; more uniform maintenance of the set steering angle, without sudden variations in lateral thrust; a very gradual response to the set steering angle and consequent load transfer; less sway when moving back into a lane after overtaking.

The invention claimed is:

1. A tyre for vehicle wheels, comprising:
a carcass structure comprising at least one carcass ply;
a belt structure applied in a radially outer position with respect to said carcass structure; and
a tread band applied in a radially outer position with respect to said belt structure,
wherein the belt structure comprises at least two main belt layers and first and second reinforcing strips that are axially spaced from one another and that are arranged in respective ends of the belt structure, said first and second reinforcing strips being arranged in a radially outer position with respect to said at least two main belt layers, the first and second reinforcing strips incorporating a plurality of reinforcing elements arranged substantially in a circumferential direction;
wherein the reinforcing elements comprise at least one high-elongation metal cord;
wherein the metal cord comprises a plurality of intertwined strands and each strand comprises a plurality of filaments;

wherein substantially all the filaments of each strand have a diameter not greater than 0.175 mm;

wherein said first and second reinforcing strips are formed by two or more radially superimposed turns of a rubberized tape;

wherein the belt structure also comprises a further belt layer arranged in a radially outer position and extending over at least one half of a width of each of the first and second reinforcing strips;

wherein axially outer ends of a radially outermost layer of said at least two main belt layers are arranged to extend axially further than axially outer ends of the first and second reinforcing strips, wherein axially outer ends of the first and second reinforcing strips are arranged to extend axially further than axially outer ends of the further belt layer, wherein said plurality of reinforcing elements comprises a first number of reinforcing elements with filaments having a first diameter and a second number of reinforcing elements with filaments having a second diameter, the first diameter being smaller than the second diameter, and wherein the reinforcing elements with filaments having a first diameter are arranged in an axially innermost position and the reinforcing elements with filaments having a second diameter are arranged in an axially outermost position.

2. The tyre according to claim 1, wherein substantially all the filaments of each strand have a diameter not greater than 0.16 mm.

3. The tyre according to claim 2, wherein substantially all the filaments of each strand have a diameter not greater than 0.15 mm.

4. The tyre according to claim 1, wherein said further belt layer extends substantially over an entire width of each of said first and second reinforcing strips.

5. The tyre according to claim 1, wherein said at least one high-elongation metal cord has a configuration n×m, wherein n represents a number of strands and is equal to 2, 3, 4 or 5, and wherein m represents a number of filaments in each strand and is equal to 5, 6 or 7.

6. The tyre according to claim 5, wherein at least one strand of the metal cord comprises a central filament and crown filaments which are arranged so as to form a single circular crown ring around said central filament.

7. The tyre according to claim 6, wherein a diameter of the central filament is greater than a diameter of the crown filaments by a percentage not exceeding 25%.

8. The tyre according to claim 1, wherein the said at least two main belt layers incorporate a plurality of reinforcing elements which are substantially parallel to each other, the reinforcing elements in each main belt layer being inclined with respect to the circumferential direction of the tyre and being oriented so as to intersect reinforcing elements of an adjacent main belt layer.

* * * * *